United States Patent [19]
Lira et al.

[11] Patent Number: 6,099,609
[45] Date of Patent: Aug. 8, 2000

[54] MOVING SORBENT FILTER DEVICE

[75] Inventors: Ricardo Lira, Woodbury; Yuan-Ming Tang, New Brighton; Michael Harms, Woodbury, all of Minn.

[73] Assignee: 3M Innovative Properties Company, St. Paul, Minn.

[21] Appl. No.: 09/126,190

[22] Filed: Jul. 30, 1998

[51] Int. Cl.$^7$ ............................ B01D 33/00; B01D 45/14
[52] U.S. Cl. ................................ 55/400; 55/467; 55/471; 55/473; 55/498; 55/486; 55/524; 55/DIG. 39
[58] Field of Search ............................ 55/309, 400, 401, 55/404, 467, 471, 473, 524, DIG. 39, 498, 486, 277, 285, 270

[56] References Cited

U.S. PATENT DOCUMENTS

| | | | |
|---|---|---|---|
| Re. 30,782 | 10/1981 | van Turnhout | 264/22 |
| 2,272,746 | 2/1942 | Holm-Hansen | 183/4 |
| 3,123,286 | 3/1964 | Abbott | 230/134 |
| 3,126,263 | 3/1964 | Schwab | 55/317 |
| 3,392,512 | 7/1968 | Ziolko et al. | 55/400 |
| 3,402,881 | 9/1968 | Moore et al. | 230/232 |
| 3,590,629 | 7/1971 | Courbon | 73/28 |
| 3,676,985 | 7/1972 | Foreman et al. | 55/317 |
| 3,765,155 | 10/1973 | Courbon | 55/270 |
| 3,877,905 | 4/1975 | Novak | 55/404 |
| 3,877,906 | 4/1975 | Peterson | 55/404 |
| 3,898,066 | 8/1975 | Miskiewicz | 55/317 |
| 3,931,016 | 1/1976 | Lovelady | 210/297 |
| 3,993,564 | 11/1976 | Novak | 210/360 |
| 4,038,058 | 7/1977 | Miskiewicz | 55/317 |
| 4,071,336 | 1/1978 | Yamine | 55/203 |
| 4,266,829 | 5/1981 | Divers | 299/64 |
| 4,292,055 | 9/1981 | De Castella et al. | 55/233 |
| 4,308,041 | 12/1981 | Ellis et al. | 55/510 |
| 4,411,675 | 10/1983 | de Castella | 55/316 |
| 4,422,824 | 12/1983 | Eisenhardt, Jr. | 416/5 |
| 4,450,756 | 5/1984 | Kling | 98/115 |
| 4,469,084 | 9/1984 | Gillotti | 126/96 |
| 4,534,230 | 8/1985 | Courbon | 78/863.23 |
| 4,547,208 | 10/1985 | Oace | 55/400 |
| 4,658,707 | 4/1987 | Hawkins et al. | 98/2.11 |
| 4,676,721 | 6/1987 | Hardee | 416/146 |
| 4,753,573 | 6/1988 | McKnight | 416/62 |
| 4,840,650 | 6/1989 | Matherne | 55/385.1 |
| 4,889,543 | 12/1989 | Burt | 55/97 |
| 4,917,942 | 4/1990 | Winters | 428/286 |
| 5,057,128 | 10/1991 | Panzica et al. | 55/181 |

(List continued on next page.)

FOREIGN PATENT DOCUMENTS

| | | |
|---|---|---|
| 0 196 337 A1 | 3/1985 | European Pat. Off. . |
| 0 306 278 A1 | 3/1989 | European Pat. Off. . |
| 0 810 023 A1 | 12/1997 | European Pat. Off. . |
| 2219846 | 10/1973 | Germany ............... 55/472 |
| 11-90146 | 9/1997 | Japan . |
| 1037365 | 7/1966 | United Kingdom ........ 55/467 |
| 2223187 | 4/1990 | United Kingdom ........ 55/400 |
| WO 91/11246 | 8/1991 | WIPO . |
| WO 97/44624 | 11/1997 | WIPO . |

OTHER PUBLICATIONS

American National Standard Method for Measuring Performance of Portable Household Electric Cord–Connected Room Air Cleaners, ANSI/AHAM AC–1–1988, Association of Home Appliance Manufacturers, 24 pages.

*Primary Examiner*—David A. Simmons
*Assistant Examiner*—Robert A. Hopkins
*Attorney, Agent, or Firm*—Gary L. Griswold; Robert W. Sprague; William J. Bond

[57] ABSTRACT

There is provided a moving sorbent filter within an air delivery device. The air delivery device has a housing having an air inlet and an air outlet, between the air inlet and the air outlet is located an air delivery fan having at least two rotating air moving means. The rotating air moving means intersect the flow of air between the air inlet and the air outlet and establish a higher pressure zone at the air outlet relative to the air inlet. The air delivery fan further comprising a moving porous sorbent filter formed of at least one sorbent filter element. The sorbent filter has at least one air passage allowing substantially unimpeded airflow into and through the sorbent filter.

34 Claims, 7 Drawing Sheets

U.S. PATENT DOCUMENTS

| | | | |
|---|---|---|---|
| 5,230,800 | 7/1993 | Nelson | 210/496 |
| 5,238,473 | 8/1993 | Femiani | 55/290 |
| 5,256,476 | 10/1993 | Tanaka | 428/241 |
| 5,265,348 | 11/1993 | Fleishman et al. | 34/97 |
| 5,292,479 | 3/1994 | Haraga et al. | 422/5 |
| 5,332,426 | 7/1994 | Tang et al. | 96/153 |
| 5,341,565 | 8/1994 | Kuryliw | 29/889.721 |
| 5,370,721 | 12/1994 | Carnahan | 55/279 |
| 5,514,197 | 5/1996 | Den | 55/405 |
| 5,560,835 | 10/1996 | Williams | 210/783 |
| 5,573,563 | 11/1996 | Odom | 55/301 |
| 5,681,364 | 10/1997 | Fortune | 55/400 |
| 5,683,478 | 11/1997 | Anonychuk | 55/385.3 |
| 5,749,702 | 5/1998 | Datta et al. | 415/119 |
| 5,879,230 | 3/1999 | Wardlaw et al. | 454/139 |

MOVING SORBENT FILTER DEVICE

BACKGROUND AND FIELD OF INVENTION

The present invention relates to moving sorbent filter devices, particularly moving sorbent filters designed to be used in air delivery fans.

Adsorbent air filters are conventionally formed of porous adsorbent media. The air is passed through the porous media which removes the gaseous based physical entrapment, absorption adsorption, or the like. The filter media can be particulate adsorbents such as activated carbon, silica gel, or activated aluminum or the like formed into a sheet or other form by particulate binders, adhesives, entrapment in a fibrous or other matrix or other means. The adsorbent media can be flat or formed into a three dimensional configuration. Pass through type filters will act on the entire airstream passed through the filter media with an associated pressure drop and filtration efficiency that is characteristic of the media, its level of loading and the airstream velocity and pressure. A problem with these filter medias is that they become loaded creating pressure drop increases.

Generally, most filters used are static with the air driven through the filter. However moving type filters have been proposed. Moving particle filters have been proposed, for example, to keep fresh filter media in the path of the airstream to be filtered as disclosed in U.S. Pat. No. 5,560,835 (driven slowly by drive rotor) or U.S. Pat. Nos. 4,038,058 and 3,898,066 (filter media driven by air impinging on rotor blades). These filters operate like conventional flow-through static filters and have the associated problem of pressure drop buildup over time. Flow through type filters have also been associated with faster moving devices such as rotating disk drives (U.S. Pat. No. 4,308,041), on an air inlet to a combine vent fan (U.S. Pat. No. 3,392,512), between fan blades on an air inlet fan for a turbine engine (U.S. Pat. No. 3,402,881), on a fume exhaust fan (U.S. Pat. No. 4,450,756), or in an air inlet to a building ventilation fan (U.S. Pat. No. 3,126,263). The proposed filters placed on a fan designed to circulate air (e.g., U.S. Pat. Nos. 3,402,881 and 4,450,756) have the filter media strategically placed to ensure that all the air passing through the system is passed through the filter media. In U.S. Pat. No. 3,402,881, the filter media 100 is woven between fan vanes 98 and sealed to prevent air from bypassing the filter media. This requires that the filter media be periodically cleaned. This cleaning is done by a complicated periodic backflow of air from the engine compressor or like source of high pressure air in the system. With U.S. Pat. No. 4,450,756, the filter must be periodically removed and cleaned or replaced. If the filter is not replaced when loaded, the pressure drop across the filter rises often to unacceptable levels, cutting off airflow. Although not desirable generally in certain filter applications this reduction in airflow is unacceptable.

It has been proposed in the art to use sorbents or sorbent filters with moving fans and the like. In U.S. Pat. No. 4,292,055, active chemical reagents such as activated manganese dioxide or other oxidizing agent are coated onto or impregnated into a rough surface material to allow for the cleaning of gaseous fluids passing over the moving surface of a rotor or other rotating surface. The "filtering" surface does not allow fluid to pass. It has also been proposed in U.S. Pat. No. 5,256,476 to mold adsorbent particles such as silica, zeolites or activated carbon into a variety of three-dimensional shapes using a blend of plastic particles and the adsorbents. As they are molded under pressure, there would be minimal permeability of the resulting article. U.S. Pat. No. 5,514,197 disclose a rotating paddle wheel with blades that are formed in part of woven activated carbon filaments. The device does not actively move air, rather is placed at the inlet of an air-purifying device.

With sorbent or particulate filters in automotive cabin applications, increases in pressure, due to filter media particle loading can drastically reduce airflow, which can result in dangerous window fogging. In automotive or furnace filter applications, the general approach has been to place a particle and/or sorbent filter at some location in the airstream (e.g., in the ducts) to intersect the entire airstream. The filter is generally very open to prevent undue increases in pressure drop, optionally with sorbent filters a particle filter can be used upstream to prevent filter clogging and increased pressure drop. Commercially the almost universal approach has been to place filters at various locations between the air inlet and air outlet in a vehicle or home heating and air conditioning system. An issue with these filters is they are often difficult to access unless they are located near the air inlet or outlet(s). However if the filter is located at or near an air inlet (which generally are easy to access) the filter only filters incoming air or recirculated air, but not both, unless multiple filters are used at the air inlet(s) for fresh air and the air inlet(s) for recirculated air. In a novel variant of this general approach, U.S. Pat. No. 5,683,478 proposes placing a static particle and/or sorbent filter inside a fan of the blower motor assembly intersecting the airstream immediately prior to the fan, as both recirculated and fresh air directed through the fan are filtered.

Ceiling fans have also been provided with filters. Generally, as discussed in WO 97/44624 (Crowhurst et al.), the filter media is provided on the outside surface of the fan blades. This patent application proposes placing a particulate or sorbent filter in the fan blade to allow air to pass through from a high pressure zone on the bottom of the fan blade to a low pressure zone on the top of the fan blade. The filter material can be sorbent or particulate filter materials. However, none is specifically disclosed. Other ceiling fans provide with particulate filters include U.S. Pat. No. 5,370,721 (placed on top of fan blade); U.S. Pat. No. 5,341,565 (cavity in fan blade provided with rigid filter elements); U.S. Pat. No. 4,889,543 (filter attached between fan blades); U.S. Pat. No. 4,840,650 (filter material of nonwoven fibers in frame secured to leading edge of fan blade); U.S. Pat. No. 4,753,573 (particulate filter adhered to surfaces of fan blade which filter could also have activated carbon impregnated into filter); and U.S. Pat. No. 4,676,721 (cover of woven material attached to fan blades). With ceiling fans of this sort, filtration is limited by the large volume of air moved. Low efficiency is offset by recirculation, which allows the fan to operate on the same air repeatedly unlike in a single pass housed system.

With single pass housed systems, air is passed through ducting or a housing or the like containing the air moving fan or the like. Unlike a ceiling fan, all the air must pass through the fan and the inlet and exit flow channels on either face of the fan. With this type of closed system, conventional flow through filter materials that are used function at very low pressure drops to ensure that the system, even if the filter is fully loaded with particulates, does not unacceptably reduce airflow. However, if the filter media is of the very low pressure drop type it generally is a low efficiency filter. Alternatively, it has been proposed that a certain portion of the airflow bypass the filter to ensure that pressure drop does not rise unacceptably during the lifetime of the filter. An air bypass of this type can eliminate the issue of unacceptably reduced airflow through the HVAC system due to a fully loaded filter but severely impacts filtration efficiency, particularly when filtering incoming air. Ideally, to ensure adequate airflow to an automotive cabin, the pressure drops of a filter in the HVAC system should show little or no pressure drop or reduced airflow over its lifetime, no matter how long it is in use. Similarily, home heating system filters should not significantly reduce airflow even when fully particle laden.

SUMMARY OF THE INVENTION

The invention device relates to a novel air sorbent filter device for use in a heating ventilation or air conditioning system or the like where the filter device preferably shows little or no pressure drop over its useful life. The invention air filter device comprises a housing having an air delivery fan, preferably a fan having an axial air inlet and a radial air outlet. An axially rotating fan and filter unit is located between the air inlet and air outlet. The fan/filter units, if separate, have a common axis of rotation, which is generally parallel with the axial air inlet of the filter housing. The filter unit is comprised of at least one filter element with flow through air channels. These flow channels can be defined by opposing faces that are mutually spaced over at least a portion of their entire width and/or length such that air can pass unimpeded in an air channel formed between the adjacent front and back faces. Adjacent filter element front and back faces are preferably on different filter elements. Preferably, multiple filter elements are spaced in the radial direction and are parallel with the axis of rotation. The fan and filter units are also provided with air moving means, which can be air moving elements and/or air filter elements. The air moving elements are also preferably spaced in the radial direction around the axis of rotation and are parallel with the axis of rotation. The optional air moving means establish the airflow with a general airflow direction at a given pressure head and volumetric flowrate. With the preferred centrifugal type fan the air is drawn in axially with the fan and filter unit axis of rotation and discharged radially outward. The air moving elements and/or filter elements are spaced from adjacent air moving elements and/or filter elements to allow the unimpeded passage of air between the air moving elements and/or filter elements.

BRIEF DESCRIPTION OF THE DRAWINGS

The following drawings illustrate preferred, but not exclusive embodiments of the invention.

DETAILED DESCRIPTION OF THE INVENTION

Figure 1:
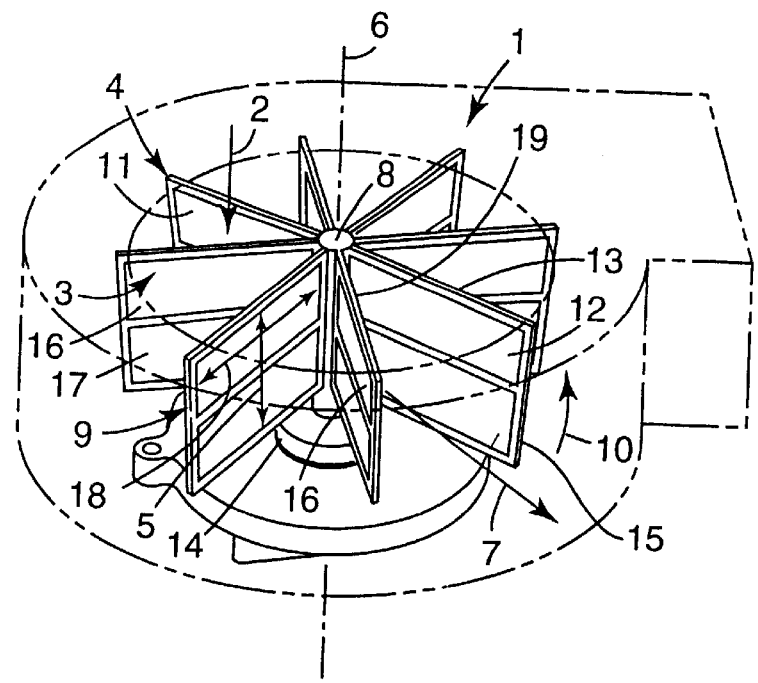
FIG. 1 is a perspective view of a filter according to a first embodiment of the invention.

The air delivery device of the present invention comprises a housing having an air inlet and an air outlet. The housing generally is continuous between the inlet and outlet so as not to allow air to enter or leave the device other than at the inlet and outlet respectively. However, small bypass vents can be provided so long as the net flow of air to the outlet is not significantly reduced. Between the air inlet and the air outlet is located an air delivery fan having at least two rotating air moving means. Air delivery device air moving elements are air impermeable and are generally fan blades that radiate outward from the central axis of rotation or are arranged around the central axis of rotation (e.g. in an annular array). The rotating air moving and/or filter elements intersect the flow of air between the air inlet and the air outlet and establishing a higher pressure zone at the air outlet and a lower pressure zone at the air inlet. The air moving or filter elements positioned in the housing such that there is a relatively small area available for air to bypass the air moving and/or filter elements. Air which enters the low pressure zone formed at the air inlet is drawn into and through the rotating air moving and/or filter elements and is forced toward the air outlet under pressure, generally about 5 mm water or greater, preferably about 10 mm water or greater than the air inlet pressure.

The air delivery fan comprises at least one air filter element. The preferred filter element(s) have an upstream filter face and a downstream filter face where at least the upstream filter face rotates along the same axis of rotation as any air moving elements. Like the rotating air moving elements, the filter elements are preferably situated on the air delivery fan such that substantially the entire airstream passing through the fan intersects one or more filter elements prior to being forced to the air outlet by the air moving elements or the filter elements. The filter elements do this by being situated in the housing such that the filter elements are generally coextensive with any air moving means or elements in a given lengthwise extent. This given lengthwise extent of the air moving means or elements is generally perpendicular to the direction of the airflow toward the air outlet or perpendicular to the direction of rotation of the air moving elements. The air filter elements will extend across the entire cross-sectional area of the housing, which is traversed by the air moving means and through which the airflow is passed toward the air outlet. However, if desired, a given substantial portion of the given lengthwise extent of an air moving element(s) can be provided without an air filter element permitting a portion of the airstream to go unfiltered by bypassing the provided filter element. If multiple air filter elements are provided at different radial locations of the fan, each filter element can have different portions provided without filter media along the same given lengthwise extent.

For each preferred filter element, there is an upstream filter face and a downstream filter face. The upstream filter face generally faces the direction of rotation of the fan air moving elements or filter elements with the downstream filter face facing the direction opposite the direction of rotation of the air moving or filter elements. As such, the upstream filter face moves at an angle relative to the airflow in the air delivery fan such that the upstream filter face impacts the moving airflow, permitting a portion of the air to flow through the filter element from the upstream filter face to a downstream filter face and from the downstream filter face back into a new portion of the airflow. The upstream filter face acts like an airfoil with higher pressure air on this face forcing air into and through the filter element to the downstream filter face which is at a lower air pressure.

Between an adjacent upstream filter face and downstream filter face, along the filter element in the direction of the given lengthwise extent, there is a filter element leading edge and a primary trailing edge forming an upstream filter face. The filter element leading edge is generally displaced axially outward of the trailing edge and/or is forward of the trailing edge in the direction of rotation. It is possible that a secondary trailing edge be displaced axially outward of the leading edge, for example, where the filter element is in the form of a zigzag filter or the like, however, the leading edge will be forward of this secondary trailing edge in the direction of rotation. In any event, the filter element or elements do not extend continuously in the direction of rotation of the fan, as such, air can flow past a given filter element in the air flow channels provided. The air flow channels are generally provided between the upstream face of a filter element and an adjacent downstream filter face, generally an adjacent filter element downstream face, and are spaced to allow airflow toward the air outlet without any pressure drop (generally by flow passages such as holes, gaps or the like, formed in or between the upstream and downstream filter faces). Generally, the adjacent upstream and downstream filter faces forming the air flow channels are between one filter element and an adjacent filter element. The air flow passages (e.g., gaps or holes) are provided to allow unimpeded airflow out of a flow channel and generally corresponding air flow passages (e.g., holes or gaps) are provided to allow unimpeded airflow into the flow channel. However, secondary flow channels can be formed between upstream and downstream faces of filter elements where there are only outlet air passages. Generally, these secondary air channels would be in fluid communication with primary air channels via a filter element filter media, and would be formed by folding or like directional changes in the filter element creating a flow channel between the downstream filter face and an opposing portion of the same filter face acting as a secondary upstream filter face.

The filter element generally can extend at least 0.5 cm on average on the upstream face(s) from the leading edge to the trailing edge, preferably at least 1 cm, however, the extent of the filter element depends on the size of the air delivery device and its operation. This distance on the upstream face between the leading edge and the trailing edge generally defines the amount of available filter material or media available for filtration of a given portion of the airstream as this portion of the airstream flows past the upstream filter face of the filter element. Of course, that fraction of this airstream portion that passes through the upstream filter face is available for further filtration as part of a new portion of the airstream between the downstream filter face and any adjacent upstream filter face.

The filter element generally comprises a sorbent filter web comprised of bonded, particle or fibers, sorbent optionally with, on or within support web. The filter is generally an adsorbent where at least a portion of the particles or fibers are adsorbents such as activated carbon, activated alumina, silica gel or zeolites. Generally, the filter element sorbent filter web has an average Frazier Permeability of about 14000 $m^3/hr/m^2$, preferably at least about 2000 to about 16000 $m^3/hr/m^2$, most preferably 6000 to 15000 $m^3/hr/m^2$. However, it is possible for a sorbent filter web to have variable permeability's between the leading and trailing edges with portions either above or below the preferred ranges. If the filter or filter web does vary in permeability, preferably the most permeable material is on that portion of the filter media with the slowest speed of rotation (e.g., the portion closest to the axis of rotation).

The sorbent filter media is generally formed of particulate or fibrous adsorbents such as activated carbon formed into a sheet-like web structure. The fibers or particulates can be bonded to each other or a support web by use of particulate binders such as polyethylenes, polyurethanes polyesters, polyacrylates, polyurea, polyamides, polydiene block copolymers, and tackified versions and/or blends thereof. Generally, the average particle size of the binder is less than average particulate or fiber size of the adsorbent. Preferably at least 20% less or more and most preferably 90% less or more. The binder particles will typically constitute less than 40 weight percent of the filter material, most preferably less than 25 to 15 weight percent. The adsorbent particles can be formed into agglomerates as described in U.S. Pat. No. 5,332,426 (Tang et al.) or can be pressed or extruded into sheets or other three dimensional forms under heat and optionally pressure. The adsorbents can also be attached to a support web of a nonwoven fibrous web, a open cell foam, a woven web, a netting or the like by particulate binders, adhesives (e.g., pressure sensitive adhesives or the like). In this case, the support web can be coated with adhesives with the adsorbent subsequently attached thereto (e.g., in a fluidized bed, other methods of contact). The adsorbents can also be entrapped into the matrix of the support web (e.g., during the web formation for nonwoven webs such as meltblown webs, carded webs, or the like), preferably with binding agents such as binder fibers or particles, latex binders, spray adhesives or the like.

The sorbent filter element can be in the form of a general planar element such as a fan blade or a fan blade insert. Nonplanar forms of the filter element are also possible such as a V-shaped wedge or a structured sheet-like shape such as an array of adjacent peaks or valleys, or the like. Three-dimensional annular molded shapes are also possible provided there is at least one air flow passage. The air flow passage can have a constant or variable cross-section and be straight, tortuous, or the like. The filter element generally is formed by particulate filter media (e.g., of a fibrous filter) with support elements. The sorbent filter media can be formed of one or multiple layers of filter web materials which filter web may have protective cover layers on one or both faces. The protective cover layer generally is a nonextensible material when subject to the forces encountered by the filter media impacting the airstream.

Other than the sorbent filter media web, further functional layers can be included with sorbent filter media layer or layers. These further functional layers can be particle filtration layers such as charged or noncharged fibrous webs, foam filter layers, woven filter layers and the like.

The sorbent filter media support elements can be located on the ends of individual filter media elements, the sides of individual filter media elements or in the plane of the filter media. The support elements can be rigid or flexible but generally are provided to keep the filter media in place on the filter elements when the fan is rotated. If the support elements are located at the ends or sides of the filter media, generally the filter media is attached to the support elements for example, by mechanical clips, adhesive attachment, resin potting or the like. If support elements are located in the plane of the filter media generally at least some of the support elements are attached to the filter media to prevent the sidewise movement or slippage of the filter media along the filter element. Structural support elements on the downstream face of the filter media need not be intimately attached to the filter media as the rotational movement of the fan will press the filter media into frictional engagement with these support elements.

The air delivery device can be a centrifugal air delivery fan as shown in FIG. 1 having an axial air inlet 2 with air delivered radially 7 of the axis of rotation 6 of the fan 1. The air moving elements 4 have an upstream face 12 that is generally aligned with the axis rotation and a downstream face 11. The upstream face 12 is the face 12 facing the direction of rotation 10 of the fan 1. The upstream face 12 is aligned with the axis of rotation 6 such that when the upstream face intersects the airstream it provides a substantially radial direction to the airflow.

The radial direction of the airflow out of the fan is best accomplished if the air moving elements 4, or at least its upstream face 12 is in a plane that is generally parallel with the axis of rotation 6, however, the air moving elements 4 can be at a slight incline. For example, the upstream face 12 can be in a plane which intersects the axis of rotation by about 5 to 10 degrees in either direction and still provide a substantially radial direction to the airflow 7. If the plane containing the upstream face 12 is at an angle to the axis of rotation 6, this angle is preferably provided so that any axial airflow component is pushed toward the face of the fan opposite the air inlet 2 face.

In the embodiment of FIG. 1, the air moving elements 4 extend radially outward from the axis of rotation. There are eight air moving elements 4, however, as few as two air moving elements are possible, preferably at least four. More air moving elements can be used as long as the spacing between adjacent air moving elements is at least 0.5 cm, preferably 1.5 cm spacing. Additional air moving elements at a spacing of less than 0.5 cm generally provide little added benefit. In the embodiment of FIG. 1, the air moving elements 4 also comprise the filter elements where the filter media 3 is retained by support elements 9. The filter media 3 is retained by two substantially identical support element frames 9 which support element frames 9 can be engaged with each other and the filter media by mechanical engagement, adhesives, or the like.

The filter elements extend in the direction perpendicular to the airflow 7 by a lengthwise extent 5. This lengthwise extent 5 extends from the air inlet edge 13 of the fan to the opposite edge 14. When the fan is placed in a housing, the housing sidewalls will preferably be closely adjacent both the air inlet edge 13, except in a central region corresponding to the air inlet 2 and the opposite edge 14. As such the filter element extends across the entire lengthwise extent 5 of the cross sectional area in the housing that is traversed by the air moving elements, through which passes the many portions of the airflow 7. If a substantial portion (e.g., more than 75 percent) of the lengthwise extent 5 were not provided with filter media (e.g., if all the top panels 16 were blocked off), substantial portions of the radial airflow would bypass, or move through, the fan and not intersect filter media 3 and therefor be unfiltered. Relatively thin support elements 9 at the edges 14 and 13 (e.g., less than 1.3 cm) do not result in this effect due to the turbulent nature of the airflow. The filter element shown in FIG. 1 extends across the entire width 18 of the air moving element 4 from a leading edge 15 to a trailing edge 19. However, the filter element could extend over only a portion of the width 18 and still function to intersect substantially the entire airflow although with less efficiency.

Figure 2:
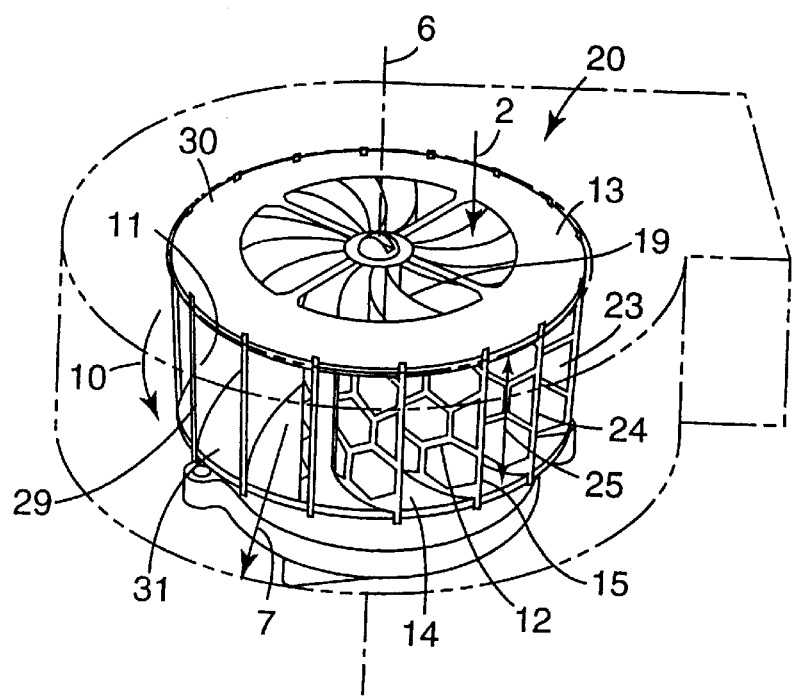
FIG. 2 is a perspective view of a filter according to a second embodiment of the invention.

FIG. 2 illustrates a second embodiment of a centrifugal fan 20 in accordance with the invention. In this embodiment, the air moving elements 24 are again filter elements formed of filter media 23 and support elements (29, 30 and 31). The filter media is attached to the support elements 29 such as by use of adhesive. The support elements 29 are in the plane of the filter media 23 and are on the downstream face 11 of the filter media. The filter media 23 of the filter elements extend across the entire lengthwise extent 25 of the air moving element 24 such that the entire airflow is ensured of contacting the filter element filter media 23 when the fan is rotated in the direction of rotation 10. The upper support plate 30 is provided with an air inlet opening 2. The bottom support plate 31 can be solid as no air is discharged axially out from this face of the fan. The support elements 29 are retained between the support plates 30 and 31.

The planar upstream face of the air moving element/filter element 24 is aligned with and parallel with the axis of rotation providing a substantially entirely radial airflow 7. The upstream face 12 in the FIG. 2 embodiment however, does not extend linearly in the radial direction as in the embodiment of FIG. 1 but is curved in the radial direction from leading edge 15 to trailing edge 19. The air moving element and/or filter element upstream face curves in the radial direction in either direction In FIG. 2 it curves generally in the direction of rotation such that the concave face is the downstream face 12 and the convex face is the upstream face 11.

Figure 3:
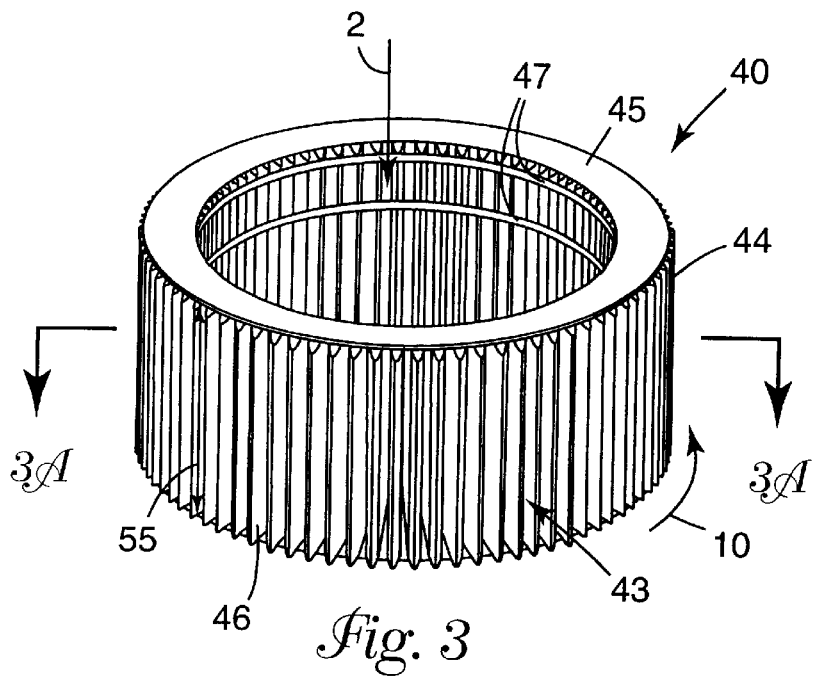
FIG. 3 is a perspective view of a filter according to a third embodiment of the invention.
Figure 3A:
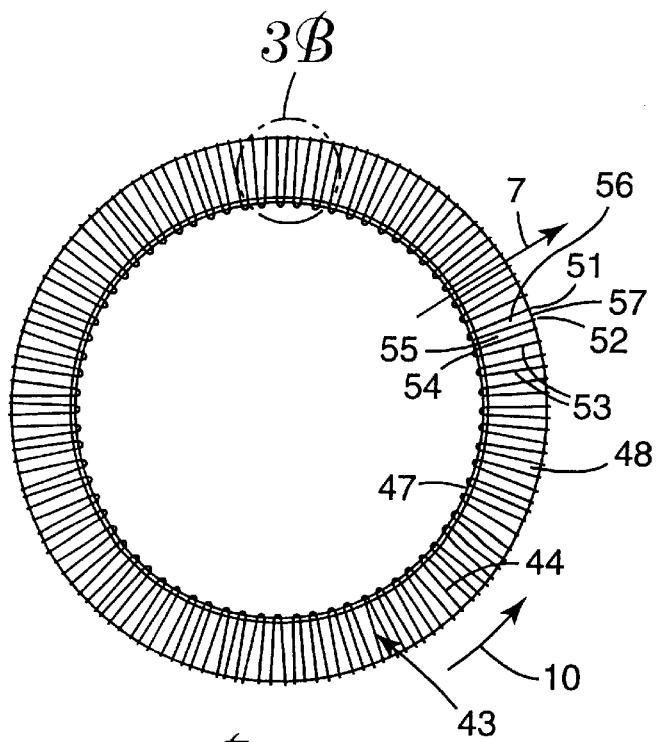
FIG. 3A is a cross-sectional view of the FIG. 3 embodiment.
Figure 3B:
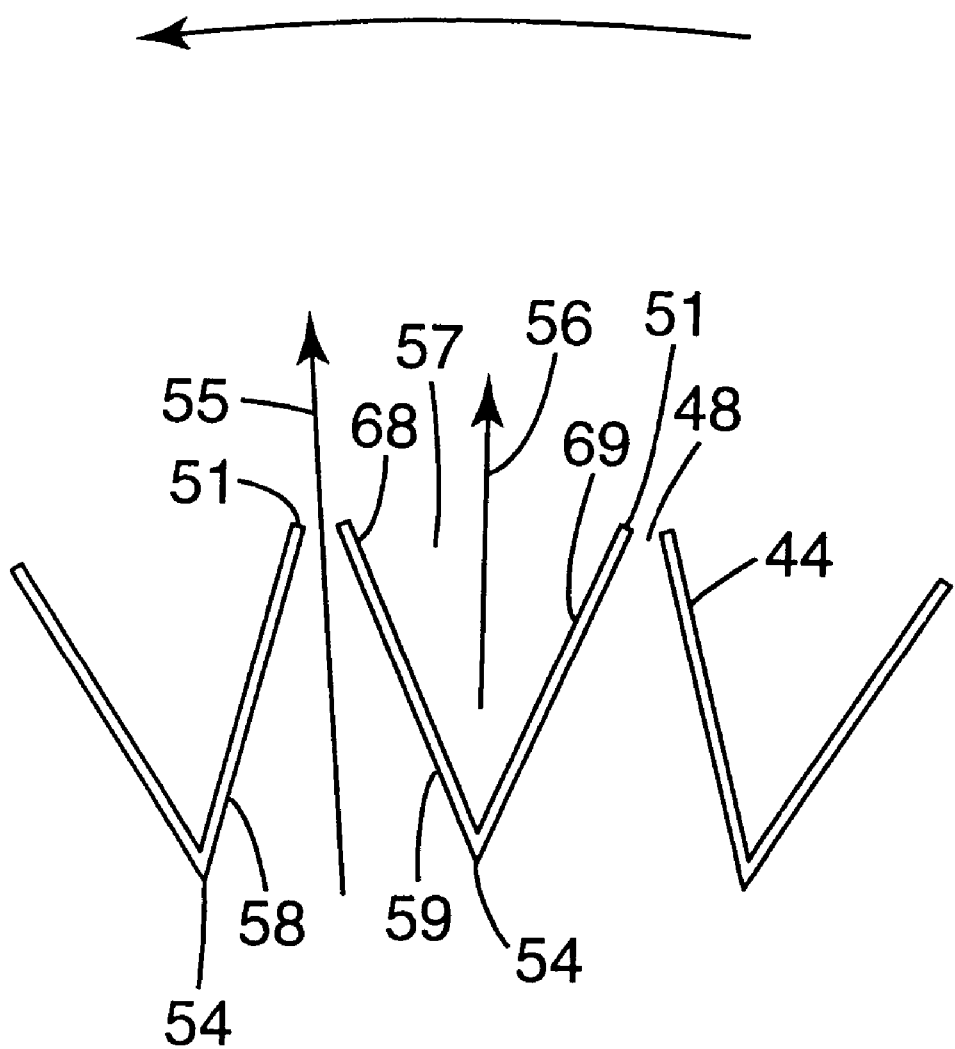
FIG. 3B is an exploded view of a cross sectional view of FIG. 3A.

FIGS. 3, 3A and 3B illustrate a third embodiment of filter elements used in an air delivery fan of the invention. The filter elements 44 are formed from a zig-zag pleated filter media 43 supported by an upper annular support disk 45 and a lower annular support disk 46. The filter media 43 is preferably also supported by rigid support elements or by support bands 47 intersecting the tips or ends of the filter media on one or both outer annular surfaces. The filter media outer pleat tips are removed to create flow passages 48. Upstream face 58 and downstream face 59 of the pleated filter media create primary flow channel 55. The filter elements 44 as such are V or U-shaped with flow through primary air channels 55 formed between the upstream face 58, formed by the leading edge 51 and trailing edge 54 of an adjacent filter element 44, and the downstream face 59 of an adjacent filter element 44, which downstream face 59 is formed between trailing edge 54 and trailing edge 52. This primary air channel 55 also forms an air passage. The air passages in this embodiment can be any appropriate size or shape but are generally at least 0.02 cm$^2$, preferably at least 0.06 cm$^2$ on average in its minimum cross sectional area. The cross sectional area of all the air flow passages for this embodiment (taken at their minimum cross sectional area for air flow passages that extend along an air channel) generally comprise from 5 to 25 percent, preferably 10 to 20 percent, of the total cross sectional area of the filter elements and any flow passages between adjacent filter elements.

A secondary air channel 56 is formed between a downstream face 68 formed between leading edge 51 and trailing edge 54 and a secondary upstream face 69, formed between trailing edge 54 and secondary trailing edge 52. This secondary air channel has an air outlet 57 but no air inlet. As such air entering air channel 56 from the downstream filter face can form a secondary airflow and exit out an air flow passage formed by the air outlet gap 57 and rejoin the primary airflow 7.

Figure 4:
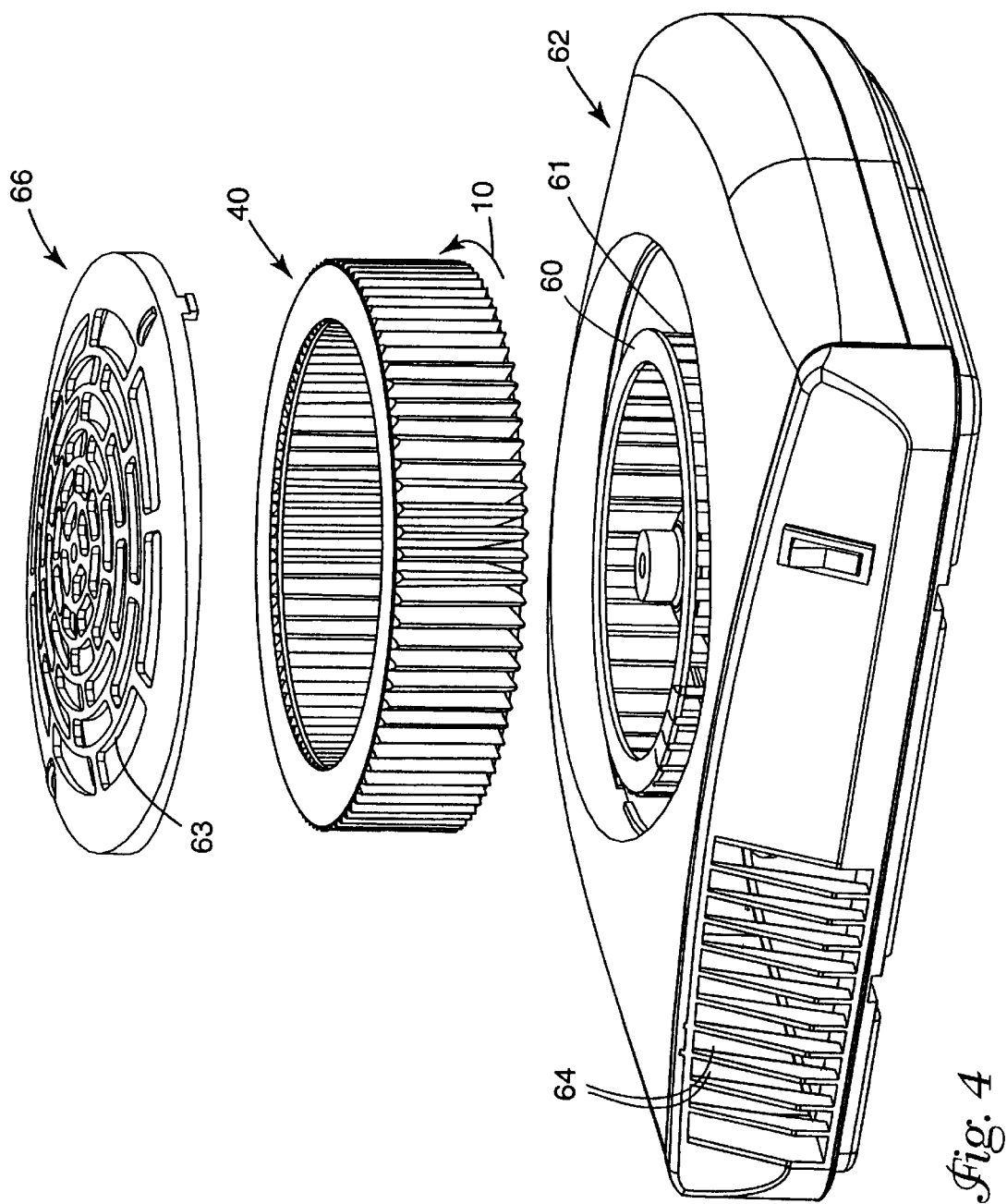
FIG. 4 is an exploded view of air delivery device in accordance with the present invention.

Annular filter 40 of FIGS. 3 and 3A can be attached to a fan 60 with separate air moving elements 61 in a housing as shown in FIG. 4. The air moving elements 61 are fan blades.

The spacing between the leading and trailing edges (51 and 52) of adjacent filter elements creates airflow channels 55 that ensure that air can freely move into the air filter elements and outward as a radial airflow 7 even when the filter media 43 forming the filter elements 44 is fully loaded with particulates. Alternatively, the filter media could be provided with holes to form flow channels between upstream and downstream filter element faces to ensure continuous airflow even when the media is fully loaded.

FIG. 4 illustrates the filter of FIG. 3 used in a housing 62 having an air inlet 63 and an air outlet 64. The air moving elements 61 are spaced radially from the axis of rotation and form fan blades provided in an annular array on a radial blower wheel 60. The air inlet is provided on a cover 66 that fits onto the main housing 62. The radial airflow from the blower wheel is directed through the filter 40 where it intersects the upstream faces of the filter elements 44. The filter and its filter elements are shown radially outward of the air moving elements in FIG. 4, however, the filter and its filter elements could be located radially inward of the air moving elements of the fan by being located inside the blower wheel.

Figure 5:
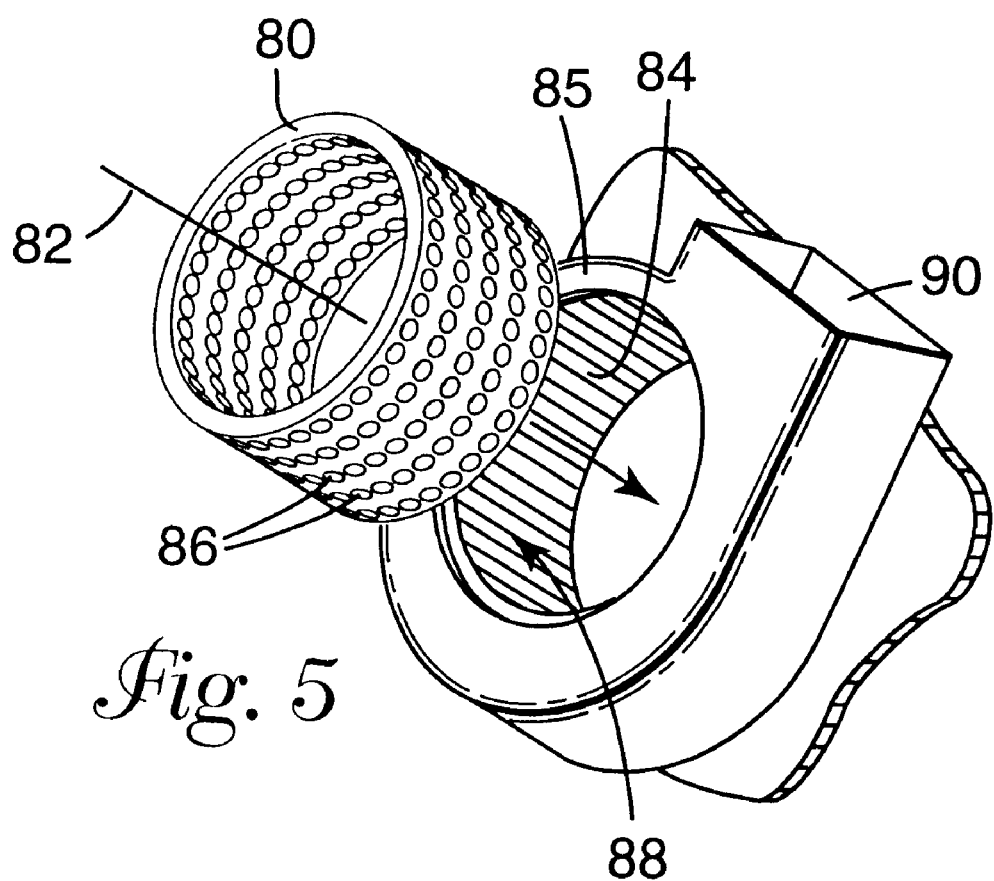
FIG. 5 is an exploded view of air delivery device in accordance with the present invention.

FIG. 5 illustrates a further embodiment of the invention where a filter 80 formed from a solid annular carbon structure is provided with air flow passage 86. The air flow passages in this embodimen can be any appropriate size or shape but are generally at least $0.02$ cm$^2$, preferably at least $0.06$ cm$^2$ on average in its minimum cross sectional area. The cross sectional area of all the air flow passages for this embodiment (taken at their minimum cross sectional area for air flow passages that extend along an air channel) generally comprise from 5 to 25 percent, preferably 10 to 20 percent, of the total cross sectional area of the filter elements and any flow passages between adjacent filter elements. The filter 80 is attached to a blower wheel 84 in a housing 85 of a centrifugal air delivery fan such as would be used in the HVAC system of a vehicle. The air inlet 82 is centrally located in the housing with the radial outlet 90 extending off the side designed to deliver air at a pressure head. The filter 80 can engage the blower 82 by a friction fitting.

When the air moving means are formed by the filter elements as shown in FIGS. 1 and 2, preferably all the air moving means are formed in whole or in part by the filter elements to ensure filtration of the entire airflow. However, one or more air moving means can be formed other than as filter elements with a resulting decrease in filtration efficiency due to bypass of the airflow without intersecting any filter elements. Where air moving elements or a fan blade form a portion of the air moving means, preferably the air moving elements are at least 25 percent of the cross sectional area of air moving means, preferably at least 75 percent of the cross sectional area.

Although not preferred, the air delivery device can also be provided by a axial fan in which case the air moving elements and/or filter element intersect the axis of rotation of the fan. In this case, a substantial portion of the airflow is given an axial flow direction and the air outlet is located on the axial face of the air delivery fan opposite the air inlet face. The filter element(s) are preferably provided along the entire widthwise extent 18 of the air moving means to prevent any air bypass without filtration.

In operation the filter elements rotate in the direction of rotation intersecting the airstream and preferably also imparting axial and/or radial movement to the airstream. At least 95 percent of the airstream is filtered by at least partially passing entirely through the air filter element filter media.

Overall, the filter media operates best when in the preferred Frazier air permeability range, both initially and when fully or partially loaded with particles. Generally, at least 5 percent of the airflow should flow through the filter media in operation, preferably from 10 to 75 percent, and most preferably 10–50 percent.

EXAMPLES

Test Procedures

Frazier Permeability

Frazier permeability, a measure of the permeability of a fabric or web to air, was determined according to Federal Test Standard 191A, Method 5450 dated Jul. 20, 1978.

Blower Pressure

Pressure developed by the mini-turbo fan assembly was defined as the difference between the dynamic pressure created between the leading and trailing faces of each blade component while rotation at a specified speed (i.e. the differential of the dynamic pressure across the filter media). This pressure was determined by using Bernoulli's equation of static pressure, "Fluid Mechanics" by V. L. Streeter & E. B Wylie, McGraw-Hill Book Co., pp. 101, 1979. The pressure developed by the centrifugal blower unit configuration is defined as the differential in air fluid pressure between the inlet of the blower assembly (i.e. the inlet of the scroll unit of the blower unit) and the dynamic pressure at the scroll outlet. The pressure drop of the moving filter in the centrifugal blower unit was determined by using Bernoulli's equation of static pressure mentioned above.

Time to Cleanup (Vapor Challenge)

This test was designed to characterize the rate at which a filter configuration reduced the vapor concentration in a known volume of air in a re-circulation mode. The test chamber consisted of a "Plexiglas" box having a one cubic meter (m$^3$) volume. The front sidewall of the test chamber was equipped with a door to allow placement of instrumentation, sensors, power supplies, etc. into the chamber. Each of the two adjacent sidewalls were individually equipped with a 10 cm (4 inch) port which served as inlet and/or outlet ports to introduce to or evacuate vapor challenges from the chamber. Two of three smaller 3.8 cm (1.5 inches) diameter ports (center and left) located on the back sidewall of the chamber were used to measure the vapor concentration in the test chamber. The central port was connected to an infrared gas analyzer ("Miran" 1B2, available from Foxboro Co., Foxboro, Mass.) by means of a 9.53 mm ID (⅜ inch) and 1.4 m (55 inches) in length "Nalgene" PE tubing. The sample stream was returned to the chamber through the left port through a 19 mm ID (¾ inch) and 1.35 m (53 inches) long "Nalgene" PVC tubing connected to the left port of the test chamber. A gas challenge of 80 ppm of toluene was used to measure the performance of the moving filters for all tests. The toluene challenge was produced by evaporating approximately 340 μl of toluene in a heated, flat receiver (30×15 mm) that was mounted at a height of 30 cm (11.8 inches) in the chamber. The liquid toluene was injected into the receiver through a 6.3 mm (0.25 inch) orifice positioned at approximately the midpoint of the edge of the right wall next to the door of the test chamber. The orifice was covered with vinyl tape after each injection took place. The re-circulation fan maintained uniform mixing of the 80 ppm toluene gas challenge before the test started. The fan was set at maximum speed during re-circulation and turned off once the gas testing started. Vapor concentration data was collected at a scanning rate of 10 seconds over a period of 5 minutes by means of a data logger model DL-3200 (available from Metrosonics Inc., Rochester, N.Y.) which was connected to the "Miran" gas analyzer for each test. The test chamber was purged of any remaining toluene vapors after each test. A log of voltage, and amperage consumption was also kept for each test using a Fluke instrument, model 87. The speed (rpm) of each moving filter was measured using a stroboscope, model 1000, available from Ametek, Inc. from Largo, Fla.

Web Thickness

Web thickness of all particulate media was measured using an electronic digital caliper, Model 721B, from Starrett, Athol, Mass.

Airflow Through Filter Media

Airflow through the various media used as filter material was calculated according to the formula:

$$\text{Flow } (m^3/hr) = (Q_M/Q_S) \times 100$$

where $Q_M$=Calculated flow through the media using the equation PERM × filter area;

where PERM is defined below.

$Q_S$=Flow delivered by the system due to the media, and is calculated as the difference $Q_C - Q_F$, where $Q_F$, the airflow due to the frame of the fan blades, was determined by operating the mini turbo fan (described below) at the indicated speed (rpms determined by a stroboscope, (model 1000, available from Ametek Inc.) recording the voltage and current draw corresponding to the rotational speed for subsequent calculations, determining the air velocity (an average of three data points) at the fan outlet using a hand held anomometer, (Model "Velocicalc Plus", available from TSI Inc., St. Paul, Minn.), and calculating the flow rate $Q_F$ by multiplying the air velocity times the cross-sectional area of the outlet.

$Q_C$, the combined airflow due to the filter media and frame, was determined using a procedure identical to that used to determine $Q_F$ except that the bare turbo blade frames were replaced with frames fitted with filter media.

PERM, the permeability of the filter media on a moving turbo blade, was calculated using the equation:

$$\text{PERM} = (\text{Frazier permeability } X P_A)/P_B$$

where

Frazier permeability for the filter media was determined as described above;

$P_A$, the pressure exerted on the filter media of a moving turbo blade, was calculated using the formula:

$$P_A = F_M/\text{Filter area}$$

where $F_M$, the force exerted on the media, defined as $T_M/(2/3)R$, where $T_M$ is the torque exerted on the media and R is the radius of the mini turbo impeller. This calculation was based on the assumptions that the velocity profile on the media was triangular, zero at the axis and maximum at the blade tip, that the net force acted at ⅔ of the impeller radius, and that torque $T_M$ could be calculated as the difference between the torque with filter media on the turbo blades and torque with only the turbo blade frames as calculated from the torque/current relationships for the electric motor used in the blower.

$P_B$, the pressure on the face of the moving filter media in the blower, was determined by placing a sample of the filter media from the turbo fan blade in a TSI Model 8110 Automated Filter Tester apparatus (available from TSI Inc.), adjusting the flow rate through the media to that calculated for an individual turbo blade (⅛ of the total flow rate), and obtaining a value for $P_B$ as a standard machine output.

Test Configurations

Mini Turbo Fan

The mini turbo fan consisted of a centrifugal flat blade filter configuration. The DC fan motor, a 9 cm Disc motor, (Part No. 090SF10, available from Hansen Corporation, Princeton, Ind.), was secured to a mounting panel which allowed the motor to positioned outside the scroll unit with only the motor shaft extending into the scroll unit to allow mounting of the fan blades. A scroll housing, designed using standard fan & blower design principles using a 10 degree diffuser angle, was constructed from art poster board (1.2 mm thickness, Cat. No. 666, available front Crescent Cardboard Co., Wheeling Ill.) which was glued together using a hot melt adhesive. The scroll unit was 6.35 cm in height, the inlet was 14.3 cm in diameter, the rectangular outlet was 10.8×5.7 cm in cross-section, and the air expansion ratio of the scroll was 1:8. The shaft of the motor was equipped with a 1.9 cm aluminum hub having eight uniformly spaced dovetail slots which received the rectangular frame units of the individual fan blades. The frames, which were 5.1 cm×5.7 cm (2 in.×2.25 in.) in dimension with a central, longitudinal support element, were machined from PVC plastic. The assembled circular cross-section of the unit was approximately 14 cm in diameter. Power was supplied to the motor by a variable voltage power source, which allowed the speed of the fan to be controlled and power consumption of the motor to be monitored.

Automotive HVAC Configuration

A dash assembly, including the air circulation ducting components, was removed from a Ford "Taurus" and used in this test configuration. An access panel was cut into the blower housing to allow various filter element configurations to be inserted into the blower wheel of the unit. Power was supplied to the motor by a variable voltage power source, which allowed the speed of the fan to be controlled and power consumption of the motor to be monitored. A 15 cm diameter, 130 cm long duct was connected to the inlet side of the HVAC system. A TSI hot wire anemometer ("Velocicalc Plus" available from TSI Inc., St. Paul, Minn.) was mounted at the end of the duct to measure the airflow rate. A manometer was used to measure the pressure developed across the blower wheel with the full HVAC system in place. A second, identical, HVAC system was then modified by removing the coils, ducting, and cutting the exit side of unit to a size which would fit into the cubic meter box. A solid, sliding baffle plate was placed on the exit of the modified system to enable the system flow and pressure to be adjusted to duplicate the flow and pressure parameters of the system prior to what it had been before several components were removed. This modified unit was then used for all particulate and gas testing. The original full HVAC system was used for all further flow, and power measurements.

Particulate Media

GSB70

A charged fibrillated film filtration media having a basis weight of 70 g/m$^2$ (available from 3M, St. Paul, Minn. under the designation "FITRETE" Air Filter Media Type GSB70).

Sorptive Media

Conwed F

An open mesh web having carbon granules bonded to substantially all surfaces of the web was prepared by applying an aerosol adhesive ("Super 77" Spray Adhesive, available from 3M as stock No. 62-4437-4930-434-7037-4444-0) to both faces of a polypropylene based square mesh web (available under the designation Conwed Fine, product No. XN-2330 from Conwed Corp., Minneapolis, Minn.), the coated web placed on a bed of activated coconut based carbon granules (Grade GG, 25×45 mesh, available from Kuraray Chemical Co., Osaka, Japan) contained in a tray, and additional carbon granules poured over the top surface of the web. Light hand pressure was applied to the granular bed to ensure adhesive bonding of the granules to the plastic mesh. The resulting sorbtive media contained approximately 300 g/m$^2$ carbon granules and had a permeability of 714 m$^3$/h/m$^2$.

Conwed L

An open mesh web having carbon granules bonded to substantially all surfaces of a polypropylene based square mesh web (available under the designation Conwed Low, product No. XN-3355 from Conwed Corp.) was prepared as described for the Conwed F media. The resulting sorbtive media contained approximately 300 g/m$^2$ carbon granules and had a permeability of 1,061 m$^3$/h/m$^2$.

Conwed M

An open mesh web having carbon granules bonded to substantially all surfaces of polypropylene based square mesh web (available under the designation Conwed Fine, product No. XN-6270 from Conwed Corp.) was prepared as described for the Conwed F media above. The resulting sorbtive media contained approximately 300 g/m$^2$ carbon granules and had a permeability of 869 m$^3$/h/m$^2$.

ESA

A carbon loaded web made with polyurethane agglomerates and GSB30 containing approximately 400 g/m$^2$ carbon granules and have a permeability of 2,798 m$^3$/h/m$^2$ (available from 3M under the designation "FITRETE" Air Filter Media, Type E).

Intermass

A Nylon based diagonal mesh pattern scrim (available from Intermass Bau-Chemie, Paris, France, stock number TI110002100 containing approximately 300 g/m$^2$ carbon granules and having a permeability of 869 m$^3$/h/m$^2$. The procedure to make this carbon loaded web was similar to the procedure used in the Conwed carbon loaded webs.

Molded Carbon Filters

"Moving" vs. "Static" Comparison

Cylindrically shaped molded carbon filters were prepared from carbon particle agglomerates substantially as described in U.S. Pat. No. 5,332,426 (Tang et.al.). which is incorporated herein by reference, using GG 16×35 carbon granules (available from Kuraray Inc). The molded filters were prepared by packing the carbon particle agglomerates into a steel mold comprised of two coaxial pieces of tubing mounted on a base plate followed by heating the loaded mold in a convection oven (available from Blue M Electric Company, Blue Island, Ill.) at 175° C. for one hour. After cooling to room temperature, the carbon agglomerate cylinder (11.5 cm OD×9.5 cm ID×5.3 cm height) was removed from the mold. A series of 84 holes, 0.64 cm in diameter and substantially uniformly spaced around the cylinder, were subsequently drilled through the wall of the filter to enhance the airflow through the filter, producing a net 12% open area in the filter and a Frazier permeability of 12,180 m$^3$/hr/m$^2$ (666 cfm/ft$^2$). The filter weighed approximately 87 g after the holes had been drilled.

Airflow Through/Open Area Comparison

Cylindrically shaped molded carbon filters were prepared substantially the same as described for the "Moving" vs. "Static" configuration described above except that the dimensions of the molded filter were 12.5 cm OD×10.5 cm ID×5.3 cm height.

Filter Assembly

Mini Turbo Fan Blades

The filter media was cut into rectangular pieces 5.1 cm×5.7 cm (2 in.×2.25 in.) in size, a thin bead of hot melt adhesive (Jet Melt, Product No. 3748-Q, available from 3M) was applied to the perimeter and central support member of the fan blade frame, a piece of the filter media was placed on the hot adhesive and slight hand pressure was applied. The adhesive was allowed to cool before any testing.

Pleated Filter Cartridges

A rectangular piece of the filter media (sized to provide the desired length of pleated filter media (dependant on the diameter of the blower wheel, pleat depth and pleat density) was formed into pleats using a Rabofsky pleater, (available from Rabofsky GmbH, Berlin, Germany). The pleated strip was mounted on a jig to hold the pleat tips at the desired spacing and two pieces of adhesive thread ("String King", available from H.B. Fuller Co., St. Paul Minn.) were attached across the pleat tips to secure their spacing. The spaced, stabilized pleat pack was then wrapped around the blower wheel (or inserted into the blower wheel) and pleats were trimmed to produce a precise fit. The pleat pack was then removed from the blower wheel, the two ends of the pleat pack were brought together to form a continuous loop and two pieces of adhesive thread about used to span across the inner pleat tips, securing the pleat pack into a cylindrical shape. Two annular poster board rings having the same diameter as the pleated cylinder were attached to the top and bottom of the filter structure using a hot melt adhesive to maintain the cylindrical shape of the filter. The outer diameter tips of the pleated filter constructions were optionally left in tact or slit, to provide a by-pass configuration, prior to testing.

Example 1

The vapor removal performance of several sorptive media as a function of the permeability of the media was studied using the Time to Cleanup (Vapor Challenge) test. A mini turbo fan was fitted with the indicated sorptive media (described above) was placed in the test apparatus, a known vapor challenge introduced into the box, and the fan operated at 2900 rpm. Vapor concentration data for these studies are reported in TABLE 1.

TABLE 1

| Time (min.) | Vapor Concentration vs. Time (% Cleanup) | | | | |
| --- | --- | --- | --- | --- | --- |
| | Conwed F | Conwed L | Conwed M | ESA | Intermass |
| 0 | 0 | 0 | 0 | 0 | 0 |
| 0.167 | 1.98 | 1.64 | 3.52 | 1.54 | 1.68 |

TABLE 1-continued

Vapor Concentration vs. Time
(% Cleanup)

| Time (min.) | Conwed F | Conwed L | Conwed M | ESA | Intermass |
|---|---|---|---|---|---|
| 0.333 | 7.74 | 5.81 | 8.72 | 5.91 | 6.54 |
| 0.5 | 15.40 | 11.36 | 15.07 | 12.26 | 13.54 |
| 0.667 | 22.64 | 16.82 | 21.18 | 18.01 | 20.22 |
| 0.833 | 30.33 | 22.59 | 27.95 | 24.79 | 27.37 |
| 1.00 | 36.85 | 27.67 | 33.65 | 30.32 | 33.87 |
| 1.167 | 43.20 | 32.86 | 39.29 | 36.32 | 40.12 |
| 1.333 | 48.85 | 37.51 | 44.31 | 41.42 | 45.42 |
| 1.50 | 54.14 | 42.03 | 49.22 | 46.15 | 50.62 |
| 1.667 | 58.95 | 45.95 | 53.26 | 50.58 | 54.88 |
| 1.833 | 63.12 | 49.94 | 57.29 | 54.67 | 59.39 |
| 2.00 | 66.63 | 53.31 | 60.65 | 58.24 | 63.00 |
| 2.167 | 70.16 | 56.63 | 64.09 | 61.84 | 66.54 |
| 2.333 | 73.05 | 59.52 | 66.98 | 64.91 | 69.55 |
| 2.50 | 75.89 | 62.39 | 69.72 | 68.06 | 72.38 |
| 2.667 | 78.09 | 64.96 | 72.06 | 70.49 | 74.81 |
| 2.883 | 80.37 | 67.31 | 74.48 | 73.07 | 77.14 |
| 3.00 | 82.20 | 69.49 | 76.38 | 75.21 | 79.00 |
| 3.167 | 83.86 | 71.57 | 78.45 | 77.22 | 80.92 |
| 3.333 | 85.33 | 73.48 | 80.00 | 79.05 | 82.50 |
| 3.50 | 86.68 | 75.38 | 81.59 | 80.82 | 84.17 |
| 3.667 | 87.94 | 76.78 | 83.16 | 82.33 | 85.44 |
| 3.833 | 89.09 | 78.26 | 84.34 | 83.91 | 86.69 |
| 4.00 | 90.06 | 79.72 | 85.54 | 85.14 | 87.77 |
| 4.167 | 90.94 | 81.00 | 86.71 | 86.41 | 88.90 |
| 4.333 | 91.72 | 82.11 | 87.56 | 87.49 | 89.70 |
| 4.50 | 92.40 | 83.43 | 88.57 | 88.52 | 90.54 |
| 4.667 | 93.06 | 84.36 | 89.34 | 89.22 | 91.24 |
| 4.833 | 93.57 | 85.29 | 90.19 | 90.22 | 91.84 |
| 5.00 | 94.10 | 86.17 | 90.78 | 90.93 | 92.56 |

Figure 6:
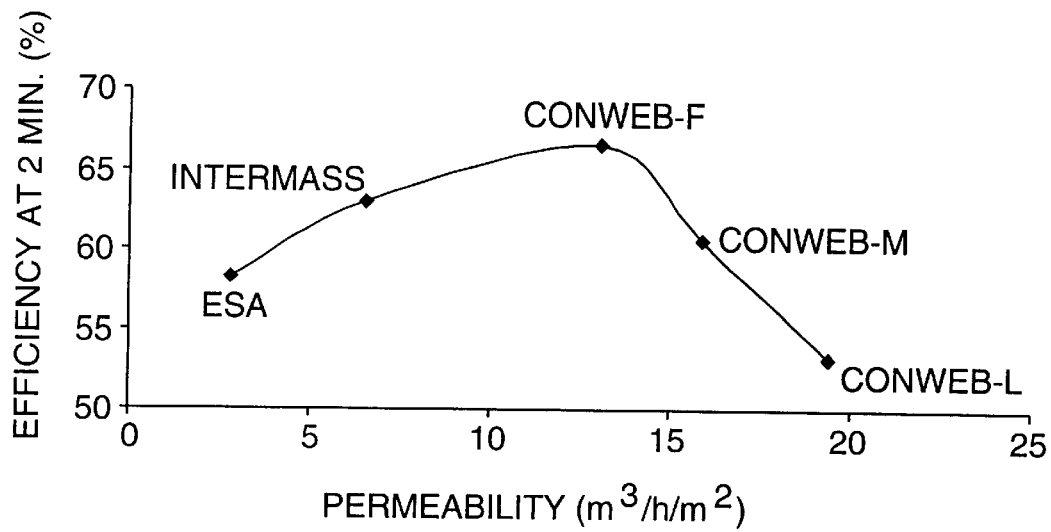
FIG. 6 is a graph of vapor removal efficiency verses filter media permeability as described in Example 1.

Examination of the data in TABLE 1 shows that when operating at comparable conditions in a "moving filter" configuration, permeability of the sorptive media significantly impacts the vapor removal. The media having too high porosity (Conwed L) exhibits poorer performance than media having more optimum porosity (Conwed F Conwed M and Intermass). TABLE 2 more clearly presents the inter-relationship between media permeability and vapor removal that is also graphically presented in FIG. 6.

TABLE 2

Vapor Cleanup vs. Media Permeability

| Sorbtive Media | Frazier Permeability[1] ft³/min/ft² | m³/hr/m² | % Cleanup (@ 1 min.) | % Cleanup (@ 2 min.) |
|---|---|---|---|---|
| Conwed F | 714 | 13,058 | 36.8 | 66.6 |
| Conwed L | 1,061 | 19,404 | 27.7 | 53.3 |
| Conwed M | 869 | 15,892 | 33.6 | 60.6 |
| ESA | 153 | 2,798 | 30.3 | 58.2 |
| Intermass | 356 | 6,517 | 33.9 | 63.0 |

1. Determined as described in the Frazier Permeability test procedure above.

Example 2

The filtration performance of a sorbtive media as a function of changing permeability of the media was studied using the Time to Cleanup (Vapor Challenge) test. Conwed F media and a Conwed F/poster board laminate were used as the sorbtive media for the study. The Conwed F media was laminated to a poster board backing by joining the edges of the poster board to the Conwed F media using a hot melt adhesive. The mini turbo fan was sequentially fitted with the two filter media, the mini turbo fan placed in the test apparatus, a known vapor challenge introduced into the chamber, the fan operated at 2900 rpm, and the vapor concentration of the apparatus monitored. Vapor concentration data for these studies are reported in TABLE 3.

TABLE 3

Vapor Removal vs. Blade Porosity
(% Cleanup)

| Time (min.) | Conwed F | Conwed F/Poster Board Laminate |
|---|---|---|
| 0 | 0 | 0 |
| 0.167 | 1.97 | 0.74 |
| 0.333 | 7.74 | 3.93 |
| 0.5 | 15.4 | 8.03 |
| 0.667 | 22.64 | 12.76 |
| 0.833 | 30.33 | 17.45 |
| 1.00 | 36.85 | 22.25 |
| 1.167 | 43.42 | 26.87 |
| 1.333 | 48.85 | 30.99 |
| 1.50 | 54.14 | 34.92 |
| 1.667 | 58.95 | 38.96 |
| 1.833 | 63.12 | 42.57 |
| 2.00 | 66.63 | 45.86 |
| 2.167 | 70.16 | 48.84 |
| 2.333 | 73.05 | 51.87 |
| 2.50 | 75.89 | 54.61 |
| 2.667 | 78.09 | 57.20 |
| 2.883 | 80.37 | 59.76 |
| 3.00 | 82.20 | 62.00 |
| 3.167 | 83.86 | 64.18 |
| 3.333 | 85.33 | 66.29 |
| 3.50 | 86.68 | 68.20 |
| 3.667 | 87.94 | 69.95 |
| 3.833 | 89.09 | 71.67 |
| 4.00 | 90.06 | 73.12 |
| 4.167 | 90.94 | 74.62 |
| 4.333 | 91.72 | 76.12 |
| 4.50 | 92.40 | 77.39 |
| 4.667 | 93.06 | 78.56 |
| 4.833 | 93.57 | 79.70 |
| 5.00 | 94.10 | 80.75 |

Examination of the data shown in TABLE 3 shows that superior vapor removal rates are realized when more air flows through the filter media (unbacked vs. backed Conwed F).

Example 3

The mini turbo fan was used as a model to calculate the percentage of air passing through various sorbtive media as a function of the rotational speed of the filter media. An average velocity, taken at ⅔ of the diameter of the mini turbo fan blade assembly, and the Frazier permeability were used to calculate the airflow through the various media, the results of which are reported in TABLE 4 and graphically presented in FIG. 7.

TABLE 4

Percent Air Passing Through Sorbtive Media vs. Filter Speed

| Speed (rpm) | $V_{ave}$ (m/sec) | Conwed F | Conwed L | Conwed M | ESA | Intermass |
|---|---|---|---|---|---|---|
| 500 | 2.2 | 46.4 | 131.6 | 95.2 | 5.9 | 13.8 |
| 900 | 4.0 | 58.7 | 139.2 | 101.3 | 9.2 | 24.5 |
| 1300 | 5.8 | 70.0 | 109.4 | 82.9 | 8.2 | 25.5 |
| 1700 | 7.5 | 73.9 | 124.0 | 82.7 | 9.0 | 27.7 |
| 2100 | 9.3 | 109.5 | 272.4 | 147.7 | 15.1 | 38.9 |

TABLE 4-continued

Percent Air Passing Through Sorbtive Media vs. Filter Speed

| Speed (rpm) | $V_{ave}$ (m/sec) | Conwed F | Conwed L | Conwed M | ESA | Intermass |
|---|---|---|---|---|---|---|
| 2500 | 10.6 | 135.5 | 274.8 | 163.0 | 20.2 | 51.2 |
| 2900 | 12.9 | 161.7 | 323.9 | 181.3 | 20.5 | 54.5 |

The vapor removal efficiency for the various sorbtive media was subsequently calculated for 2900 rpm, the results of which are shown in TABLE 5 and are graphically presented in FIG. 8.

TABLE 5

Percent Air Passing Through Filter Media vs. Vapor Removal Efficiency

| Media | Vapor Removal Eff. — (1 min. Cleanup) | Vapor Removal Eff. — (2 min. Cleanup) | % Air Passing Through Media |
|---|---|---|---|
| Conwed F | 36.8 | 66.6 | 161.7 |
| Conwed L | 27.7 | 53.3 | 323.9 |
| Conwed M | 33.6 | 60.6 | 181.3 |
| ESA | 30.3 | 58.2 | 20.5 |
| Intermass | 33.9 | 63.0 | 54.5 |

Figure 7:
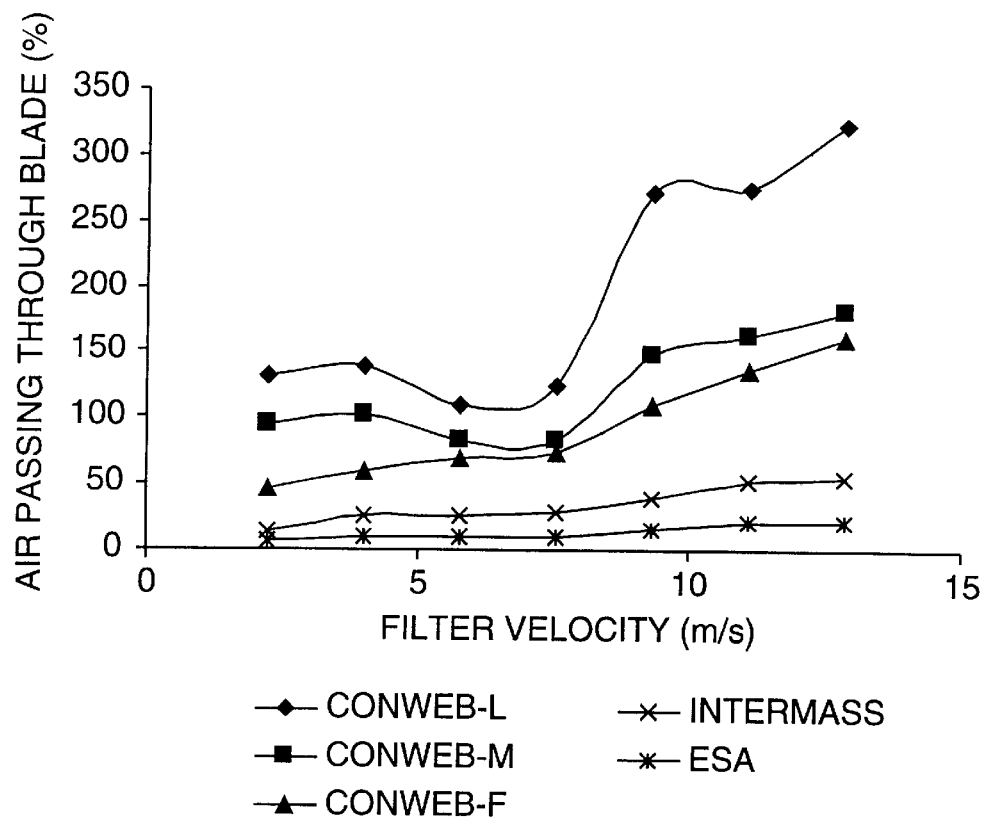
FIG. 7 are graphs of percentage of air passing through various filter blades verses filter blade velocity as described in Example 2.
Figure 8:
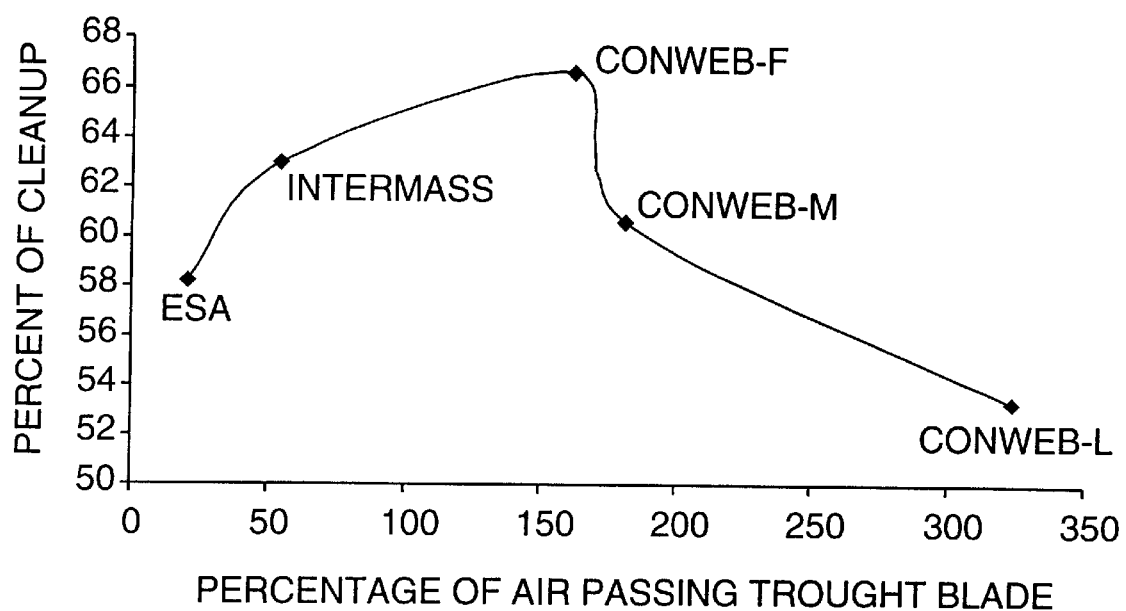
FIG. 8 is a graph of percent vapor cleanup verses percentage of air passing through a filter blade verses filter blade velocity as described in Example 2.

The data in TABLES 4 and 5 and FIGS. 7 and 8 provide a good picture of the inter-relationship of filtration performance and air passing through the sorbtive media as influenced by the velocity or speed at which the filter media is moving. This data suggests that odor removal efficiency can be optimized for a given application by selection of sorbtive media and its associated permeability and the velocity which at which the media is moved in the vapor containing atmosphere.

Example 4

Vapor removal performance as a function of the speed of the moving media was studied using the Time to Cleanup (Vapor Challenge) apparatus.

A mini turbo fan having Conwed F sorbtive media on its blades (prepared as described above) was placed in the Time to Cleanup (Vapor Challenge) apparatus, a known vapor challenge introduced into the box, and the fan operated at the speed indicated in TABLE 6. (The fan blades were replaced with new blades having unused sorbtive media for each test speed.) Vapor concentration data for these studies are reported in TABLE 7.

TABLE 7

Vapor Concentration vs. RPM (% Cleanup)

| Time (min.) | 2900 rpm | 2100 rpm | 1300 rpm | 500 rpm |
|---|---|---|---|---|
| 0 | 0 | 0 | 0 | 0 |
| 0.167 | 1.98 | 1.75 | 0.65 | 0.66 |
| 0.333 | 7.74 | 6.06 | 3.42 | 1.47 |
| 0.5 | 15.40 | 11.49 | 7.30 | 3.23 |
| 0.667 | 22.64 | 17.17 | 11.21 | 5.97 |
| 0.833 | 30.33 | 23.07 | 15.40 | 8.27 |
| 1.00 | 36.85 | 28.09 | 19.03 | 10.25 |
| 1.167 | 43.42 | 33.56 | 22.98 | 12.50 |
| 1.333 | 48.85 | 38.09 | 26.67 | 14.36 |
| 1.50 | 54.14 | 42.89 | 30.09 | 16.44 |
| 1.667 | 58.95 | 46.98 | 33.46 | 18.33 |
| 1.833 | 63.12 | 50.92 | 36.65 | 20.24 |
| 2.00 | 66.63 | 54.38 | 39.38 | 22.23 |
| 2.167 | 70.16 | 57.89 | 42.51 | 23.94 |
| 2.333 | 73.05 | 60.80 | 45.16 | 25.57 |
| 2.50 | 75.89 | 63.59 | 47.97 | 27.49 |
| 2.667 | 78.09 | 66.30 | 50.21 | 29.00 |
| 2.883 | 80.37 | 68.74 | 52.77 | 30.45 |
| 3.00 | 82.20 | 70.82 | 54.85 | 32.16 |
| 3.167 | 83.86 | 72.88 | 57.14 | 33.81 |
| 3.333 | 85.33 | 74.83 | 59.09 | 35.53 |
| 3.50 | 86.68 | 76.61 | 61.03 | 36.96 |
| 3.667 | 87.94 | 78.16 | 62.70 | 38.32 |
| 3.833 | 89.09 | 79.71 | 64.56 | 39.69 |
| 4.00 | 90.06 | 81.08 | 66.18 | 40.92 |
| 4.167 | 90.94 | 82.35 | 67.74 | 42.49 |
| 4.333 | 91.72 | 83.42 | 69.19 | 43.57 |
| 4.50 | 92.40 | 84.56 | 70.66 | 44.80 |
| 4.667 | 93.06 | 85.55 | 71.93 | 46.07 |
| 4.833 | 93.57 | 86.50 | 73.20 | 47.24 |
| 5.00 | 94.10 | 87.37 | 74.35 | 48.37 |

It is apparent from an examination of the data in TABLE 7 that the sorbtive performance of the Conwed F media showed a decided improvement as the speed of the mini turbo fan was increased. It is recognized that this data is unique to the test configuration described, and, as such, no absolute speed/sorbtive performance values can be defined which will apply to all filtration applications. However, the data does show a definite inter-relationship between the media speed and filtration performance that needs to be optimized for each combination of sorbtive media and apparatus configuration.

Example 5

The impact of various filter constructions on the airflow through the Automotive HVAC test configuration (described above) was studied by mounting the filter constructions inside the blower wheel and monitoring the airflow through the system at various operating speeds.

Filter constructions studied included a GSB70 particulate filter having slit pleat tips (with OD of 12.38 cm, an ID of 10.48 cm, and a height of 5.4 cm, prepared as described above, with 55 pleats at a pleat spacing of 6 mm, each pleat being 10 mm in height and made from the indicated filter media), a GSB70 particulate filter having holes punched through the media (same filter construction as the above filter) to produce a 20% open area, a combination filter consisting of Kuraray 7400-BN (a nonwoven web loaded with activated coconut based carbon particles, 400 g/m$^2$, available from Kuraray, Inc.) sandwiched between a GSB-30 web on one side and a Reemay 2004 web (a spunbond polyester web available from Reemay, Inc., Old Hickory, Tenn.) on the other side, a molded agglomerated carbon cylinder having no holes, a molded agglomerated carbon cylinder having 84 holes (6.4 mm in diameter) to produce a 12% open area relative to the total filter area (described above), and a molded agglomerated carbon cylinder having 90 holes (7.5 mm in diameter) to produce a 20% open area relative to the total filter area (prepared similar to the 12% open area filter except having a greater number of holes).

The GSB70 filter with holes (20% open area) was prepared in substantially the same manner as the slit pleat tip filter except that 9 square holes (5 mm each) per 4 cm² were punched into the GSB70 media prior to pleating and the pleat tips were not slit.

Each filter construction was mounted in the Automotive HVAC Configuration test apparatus (full dash unit), the unit operated at the voltages indicated in TABLE 8, and the airflow through the system determined for the various operating voltages. Airflow data for the various filter configurations are reported in TABLE 8.

TABLE 8

Airflow vs. Filter Construction (cubic meters/hour)

| Filter Type | Motor Operating Voltage | | | |
|---|---|---|---|---|
| | 4.5 | 6.0 | 9.0 | 13.0 |
| No Filter | 183 | 233 | 319 | 423 |
| GSB70 w/Slit Tips | 141 | 189 | 282 | 364 |
| GSB70 w/Holes (20%) | 144 | 185 | 260 | 360 |
| Combi-Web w/Slit Tips (20.5 g) | 109 | 139 | 207 | 289 |
| Molded Carbon — No Holes (110 g) | 88 | 107 | 163 | 223 |
| Molded Carbon w/Holes 12% Open (94 g) | 131 | 180 | 251 | 335 |
| Molded Carbon w/Holes 20% Open (83.5 g) | 138 | 183 | 255 | 340 |

The data presented in TABLE 8 demonstrate that it is possible to incorporate higher sorptive capacity filter constructions (i.e. molded carbon agglomerate filter constructions) according to the present invention into an automotive HVAC system with a minimal negative impact on the airflow characteristics of the system.

Example 6

Gas and vapor removal performance of two identical molded carbon agglomerate constructions in "moving" and "static" configurations were studied using the Time to Cleanup (Vapor Challenge) test described above, replacing the mini-turbo fan unit with the Automotive HVAC Configuration—second configuration. In this study the filter elements were placed inside the blower wheel and the Automotive HVAC unit was operated at 4.5 and 9 volts. The filter elements were molded as described above (Airflow Through open area comparison description).

The "moving" filter cartridge was mounted directly onto the blower wheel. The "static" filter was positioned just off the surface of the blower wheel by mounting it to the stationary scroll housing such that it did not contact the blower wheel in operation. Vapor concentration data for these studies are reported in TABLE 9.

TABLE 9

Molded Carbon Agglomerate Filter "Moving" vs. "Static" Vapor Removal Performance Toluene Concentration (ppm)

| Time (min.) | 9 Volt Moving | 9 Volt Static | 4.5 Volt Moving | 4.5 Volt Static |
|---|---|---|---|---|
| 0 | 79.8 | 79.9 | 80.03 | 79.65 |
| 0.167 | 70.83 | 73.15 | 75.44 | 75.05 |
| 0.333 | 59.59 | 62.27 | 68.12 | 68.57 |
| 0.5 | 49.08 | 51.42 | 61.28 | 63.16 |
| 0.667 | 40.03 | 41.98 | 54.81 | 57.73 |
| 0.833 | 32.16 | 34.15 | 49.61 | 53.20 |
| 1.00 | 25.57 | 27.94 | 44.27 | 48.80 |
| 1.167 | 20.78 | 22.45 | 39.41 | 45.23 |
| 1.333 | 16.56 | 18.50 | 35.10 | 41.40 |
| 1.50 | 13.37 | 14.99 | 31.49 | 38.32 |
| 1.667 | 10.89 | 12.32 | 27.99 | 35.25 |
| 1.833 | 8.97 | 10.16 | 24.96 | 32.49 |
| 2.00 | 7.52 | 8.47 | 22.29 | 30.01 |
| 2.167 | 6.27 | 6.97 | 20.16 | 27.80 |
| 2.333 | 5.08 | 5.93 | 18.01 | 25.46 |
| 2.50 | 4.41 | 5.15 | 16.11 | 23.75 |
| 2.667 | 3.95 | 4.51 | 14.54 | 22.00 |
| 2.883 | 3.30 | 3.96 | 13.20 | 20.33 |
| 3.00 | 2.94 | 3.46 | 11.94 | 18.73 |
| 3.167 | 2.51 | 3.08 | 10.84 | 17.55 |
| 3.333 | 2.34 | 2.92 | 9.85 | 16.24 |
| 3.50 | 2.00 | 2.57 | 9.04 | 15.13 |
| 3.667 | 1.85 | 2.46 | 8.12 | 14.03 |
| 3.833 | 1.75 | 2.34 | 7.57 | 13.07 |
| 4.00 | 1.64 | 2.17 | 6.83 | 12.16 |
| 4.167 | 1.57 | 2.13 | 6.43 | 10.63 |
| 4.333 | 1.43 | 1.98 | 5.98 | 10.67 |
| 4.50 | 1.55 | 1.94 | 5.40 | 10.01 |
| 4.667 | 1.52 | 1.83 | 5.02 | 9.30 |
| 4.833 | 1.39 | 1.81 | — | — |
| 5.00 | 1.22 | 1.83 | — | — |

While both the "moving" and "static" filter configurations eventually reached similar vapor concentrations in the test apparatus, it is apparent from an examination of the data in TABLE 9 that the "moving" filter configuration was able to reduce the vapor concentration more rapidly than the "static" filter configuration.

We claim:

1. An air delivery device comprising a housing having an air inlet and an air outlet, between the air inlet and the air outlet is located an air delivery fan having at least two rotating air moving means, the rotating air moving means intersect the flow of air between the air inlet and the air outlet and establish a higher pressure zone at the air outlet relative to the air inlet, the air delivery fan further comprising a rotating porous sorbent filter formed of at least one sorbent filter element, said sorbent filter having a permeability of at least 2000 m³/hr/m² and defining at least one air passage allowing substantially unimpeded airflow.

2. The air deliver device of claim 1 wherein the at least one sorbent filter element has at least one upstream filter face and at least one downstream filter face defining at least one primary flow channel where the at least one upstream filter face rotates along the same axis of rotation as the air moving means and where the upstream filter face moves into a portion of the airflow through the air delivery fan such that the upstream filter face impacts a portion of the moving airflow in a flow channel, permitting the air to flow through the sorbent filter element from the upstream filter face to the downstream filter face and from the downstream filter face into a further portion of the airflow in a flow channel.

3. The air delivery device of claim 1 wherein the air delivery fan is a centrifugal fan having an axial air inlet with air delivered radially of the axis of rotation of the fan wherein the air moving means have an upstream face that is generally aligned with the axis of rotation.

4. The air delivery device of claim 1 wherein the air moving means comprise air moving elements where the air moving elements are parallel with the sorbent filter elements and the axis of rotation.

5. The air delivery device of claim 4 wherein the air moving elements are radially aligned with the sorbent filter elements.

6. The air delivery device of claim 4 wherein the air moving elements are radially inward of the sorbent filter elements.

7. The air delivery device of claim 4 wherein the air moving elements are radially outward of the sorbent filter elements.

8. The air delivery device of claim 5 wherein the air moving elements comprise the sorbent filter elements.

9. The air delivery device of claim 5 wherein the air moving elements comprise at least two blade elements extending radially outward from the axis of rotation.

10. The air delivery device of claim 9 wherein the air moving elements comprise at least four fan blade elements extending radially outward from the axis of rotation.

11. The air delivery device of claim 9 wherein the blade elements have sorbent filter elements incorporated across at least a portion of its cross sectional area.

12. The air delivery device of claim 9 wherein the blade element comprises a sorbent filter element over at least 50 percent of its cross sectional area.

13. The air delivery device of claim 9 wherein the blade element comprises a sorbent filter element over at least 75 percent of its cross sectional area.

14. The air delivery device of claim 9 wherein the blade elements intersect the axis of rotation of the fan.

15. The air delivery device of claim 1 wherein the air moving means comprise at least two blade elements which blade elements are radially spaced from the axis of rotation of the fan forming an annular fan.

16. The air delivery device of claim 9 wherein the blade elements have a substantially smooth surface across the cross sectional area of the upstream face.

17. The air delivery device of claim 9 wherein the blade elements have a structured surface across the cross sectional area of the upstream face.

18. The air delivery device of claim 9 wherein the blade elements extend linearly in the radial direction.

19. The air delivery device of claim 9 wherein the blade elements extend nonlinearly or curved in the radial direction.

20. The air delivery device of claim 2 wherein the airflow passages are defined by the downstream filter element face and an adjacent upstream filter element face.

21. The air delivery device of claim 20 wherein secondary flow channels are provided with air flow passages allowing substantially unimpeded airflow to the air outlet.

22. The air delivery device of claim 21 wherein the secondary flow channels are formed by pleating of the sorbent filter elements.

23. The air delivery device of claim 21 wherein the secondary flow channels are in fluid communication with at least one primary flow channel.

24. The air delivery device of claim 23 wherein the secondary flow channels and primary flow channels in fluid communication are separated by the sorbent filter elements.

25. The air delivery device of claim 1 wherein the sorbent filter element comprises adsorbent particles or fibers.

26. The air delivery device of claim 25 wherein the adsorbents comprise activated carbon.

27. The air delivery device of claim 1 wherein the sorbent filter element has an average Frazier permeability of from 2000 to 16000 $m^3/hr/m^2$.

28. The air delivery device of claim 1 wherein the sorbent filter element has an average Frazier permeability of from 6000 to 15000 $m^3/hr/m^2$.

29. The air delivery device of claim 1 wherein the sorbent filter element has air flow passages through the filter element.

30. The air delivery device of claim 29 wherein the air flow passages are at least 0.02 $cm^2$ on average in its minimum cross sectional area.

31. The air delivery device of claim 29 wherein the air flow passages are at least 0.06 $cm^2$ on average in its minimum cross sectional area.

32. The air delivery device of claim 29 wherein the air flow passages comprises from 5 to 25 percent of the total cross sectional area of the sorbent filter elements and any minimum flow passages between adjacent flow passages.

33. The air delivery device of claim 29 wherein the air flow passages comprises from 10 to 20 percent of the total cross sectional area of the sorbent filter elements and any minimum flow passages between adjacent flow passages.

34. The air delivery device of claim 29 wherein the sorbent filter element further includes a particulate filter layer.

* * * * *